L. M. LEWIS.
DRY PIPE VALVE FOR FIRE EXTINGUISHERS.
APPLICATION FILED MAR. 15, 1920.
1,415,884.
Patented May 16, 1922.
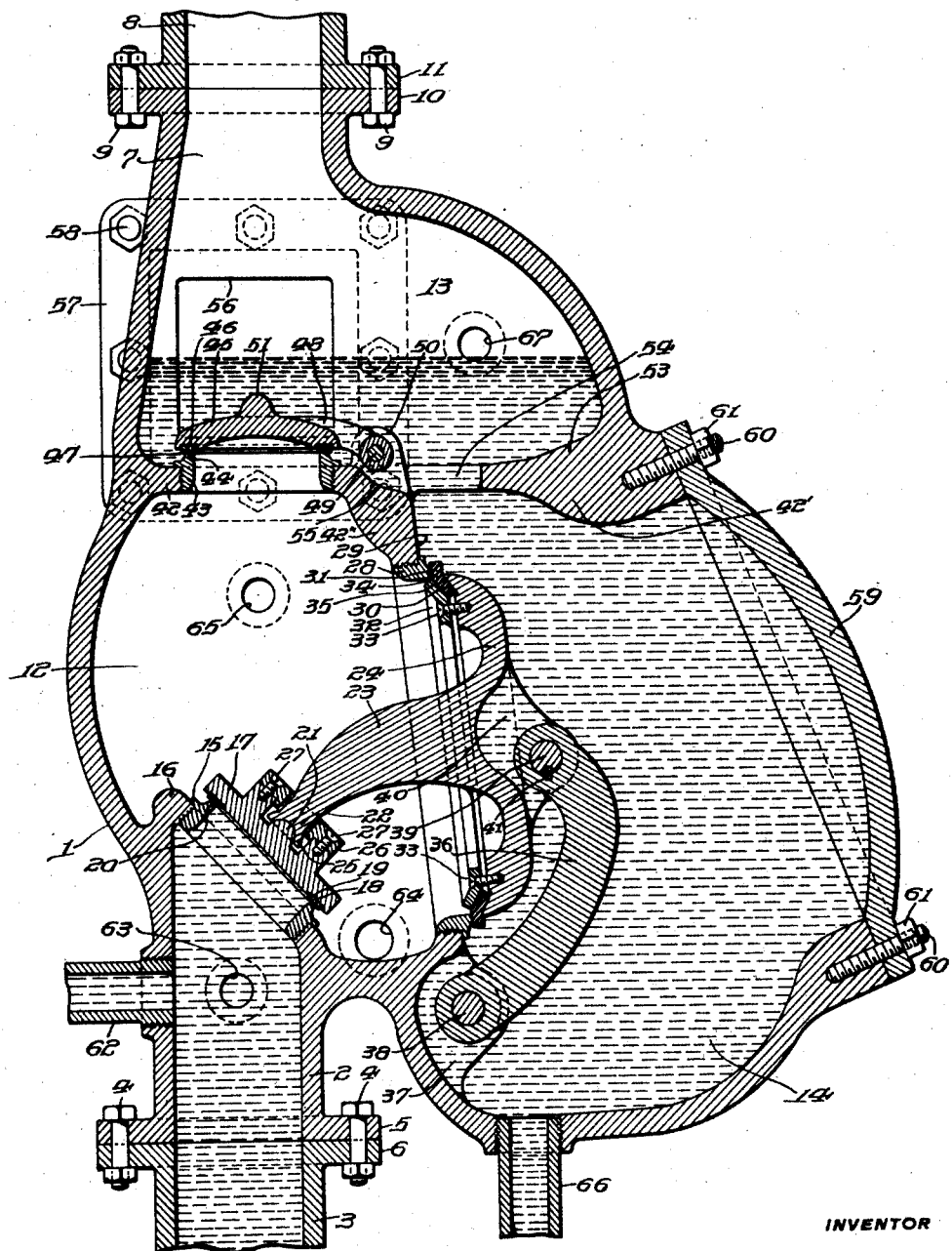
INVENTOR
Leroy M. Lewis.
WITNESS
BY
ATTORNEYS

UNITED STATES PATENT OFFICE.

LEROY M. LEWIS, OF PHILADELPHIA, PENNSYLVANIA, ASSIGNOR, BY MESNE ASSIGNMENTS, TO CENTRAL AUTOMATIC SPRINKLER COMPANY, OF PHILADELPHIA, PENNSYLVANIA, A CORPORATION OF PENNSYLVANIA.

DRY-PIPE VALVE FOR FIRE EXTINGUISHERS.

1,415,884.      Specification of Letters Patent.      Patented May 16, 1922.

Application filed March 15, 1920. Serial No. 365,747.

*To all whom it may concern:*

Be it known that I, LEROY M. LEWIS, a citizen of the United States, and a resident of the city of Philadelphia, county of Philadelphia, State of Pennsylvania, have invented certain new and useful Improvements in Dry-Pipe Valves for Fire Extinguishers, of which the following is a specification, reference being made to the accompanying drawing for an illustration thereof.

The invention relates to a dry pipe valve adapted for use in automatic sprinkler systems and operative to permit the flow of extinguishing fluid to the automatic sprinkler heads upon the bursting of one or more of said heads effected by a fire.

Among the objects of my invention is to provide a new and useful dry pipe valve of the differential valve type whereby relatively low air pressure in the sprinkler system will operate upon an air valve of relatively large area and maintain the main water valve of relatively small area in inoperative closed position against a relatively high water pressure.

Another object of my invention is to provide a new and useful dry pipe valve with a differential air and water valve so constructed that the weight of the air valve will act as a counterweight or counterbalance for the water valve whereby the force of the flow of water is only partly depended upon for initiating an opening of the valves.

Another object of my invention is to provide a device of the character above-mentioned whereby the opening of the valve will be smooth and without rebound, a quantity of water in the casing being present to aid in cushioning the opening effect of the valves during the emergency operation thereof and thereby prevent rebound thereof.

Another object of my invention is to so relatively locate and connect the air and water valves whereby the forces active on either of said valves may be transmitted substantially directly to the other of said valves with a minimum loss of forces acting on said parts.

A still further object is to locate the water valve seat at an angle to the main direction of flow of the extinguishing fluid whereby a component part of the force of flow of the water through the water valve seat will aid in effecting an opening of the air and water valves at the initial operation of the device without materially affecting the direct flow of the extinguishing fluid through the device.

A still further object of my invention is to provide a construction which will prevent water columning.

Other advantages and objects of my invention will appear more fully from the following specification and upon the accompanying drawing.

Referring to the drawing, the single figure illustrates a longitudinal section through a dry pipe valve constructed in accordance with my invention.

Referring more particularly to the drawing I have shown thereon a dry pipe valve comprising a main casing 1 provided with an inlet 2 connected to a supply conduit 3 by means of bolts 4 passing through the flanges 5 and 6 of the inlet and supply conduits respectively. The casing is provided at its opposite end with an outlet 7 secured to a distributing conduit 8 by means of bolts 9 passing through the flanges 10 and 11 of the outlet and distributing conduit respectively.

The main chamber 1 may be divided into a central intermediate chamber 12, an auxiliary valve or air chamber 13 and an air valve or cushion chamber 14, the chamber 13 being located above the chambers 12 and 14, the latter being located laterally adjacent to the chamber 12. Between the inlet 2 and the chamber 12 is provided a water valve comprising a water valve seat member 15 of relatively hard metal screw-threaded into the wall 16 formed integral with the main casing 1. Against the valve seat member 15 is adapted to seat a water valve 17 preferably of circular form and provided with an annular channel or groove 18 in which is located a suitable ring 19 of relatively soft material, such as lead, copper, brass or the like, or a composition alloy, said ring being sufficiently ductile to seat against the seat 20 of the valve seat member 15 with the liquid tight seal.

The valve 17 may be provided with a rearwardly extending hemi-spherical lug 21 adapted to fit into a counterpart socketed end 22 of a connecting arm 23 of an air valve 24, the valve 17 being adapted to rotatably move relative to the end 22 by reason of the spherical configuration of the lug 21 in the socket of the end 22 whereby upon the valve seating against the ring 15 the valve will be self-adjusting to its seat. The lower end 22 of the connecting arm 23 may be provided with a flared portion 25 and the valve 17 may be provided at the rear of said flared portion and at the rear of said valve 17 with a retaining ring 26 provided with a central bore with a diameter slightly larger than the restricted portion of the end 22 lying between the flared portion 25 and the main portion of the arm 23 whereby relatively loose play will be permitted between the ring 26 and the arm 23. The ring 26 may be rigidly secured to the valve 17 by means of screws 27 or any other suitable securing means.

Between the chambers 12 and 14 is provided an opening of relatively large diameter as respects the diameter of the water valve opening. In this opening is screw-threaded the air valve ring 28, of relatively hard metal, as in the case of member 15 described above, in the transverse wall 29 of the casing 1. The air valve 24 is preferably integrally formed with the arm 23 and is provided at the margin thereof with an inclined annular face or bevel 30 against which is placed a sealing package 31 of annular form. This packing may be secured into place by an annular member 32 suitably secured to the valve 24 by screws 33 or similar attaching means. The inner face of the annular member 32 is preferably substantially parallel to the face 30 of the valve 24 between which faces the packing 32 is tightly clamped. The annular member is also provided with an inclined surface or edge 34 at the periphery thereof so that when the valve 24 is moved towards seating position the face 34 will act as a guiding face to bring the valve into properly closed or centered position in the event that the valve should be out of alinement with relation to the axis of the valve seat. In this way the closing of the air valve will be self-adjustable to effect a proper seating thereof, packing 31 being assured a correct sealing contact or seating on the seat 35 of the ring 28.

The air valve is located in the chamber 14 and is connected to a supporting arm 36 pivotally connected to the ears 37 cast integral with the main casing 1 in the lower portion of the chamber 14, the arm 36 being adapted to freely rotate on the pivot pin 38 appropriately supported in said ears. The upper end of the arm 36 may be connected to the valve 24 by means of a shaft 39 suitably supported in rearwardly projecting lugs or ears 40 and suitably keyed by a key 41 to both the members 40 and the upper end of the arm 36 whereby a rigid connection may be made between the valve 24 and the arm 36. It is apparent that the arm 36 and the valve 24 may be cast or formed integrally but for practicability of manufacture I have found it convenient to connect the arm 36 to the valve 24 by a keyed pivot connection, as shown, to make the same rigid.

At the upper portion of the chamber 12 is provided a horizontal wall 42 provided with an aperture located with its axis slightly out of alinement with the axis of the inlet 2, to the right as shown upon the drawing. In this wall is suitably threaded the valve seat ring 43, of relatively hard metal as in the case of member 15 described above, provided with a valve seat 44 against which is adapted to seat an auxiliary air valve 45. The air valve 45 may be provided with an annular groove 46 containing an annular packing 47 of suitable yieldable character adapted to seat against the seat 44 with an air and water tight seal. The water valve 45 may be provided with an arm 48 pivotally connected by a pivot pin 49 to the lugs 50 cast integral with the wall 42. The valve 45 may be provided with a rearwardly projecting contact piece 51 which, when in open position is adapted to contact and rest against the portion 53 of the main casing 1.

The wall 42, as will be apparent from the drawing, extends across the main casing 1 over the chamber 14, as well as over the chamber 12, the extension 42' thereof, which extends over the chamber 14, being provided with an air opening 54 adapted to establish communication between the air chamber 13 and the air or cushion chamber 14, as will more fully appear hereinafter. It will be observed that the top surfaces of the walls 42 and 42' are so curved and shaped that all water included in the air chamber 13 will be adapted to drain off said surfaces through the aperture 54 into the air or cushion chamber 14, the intermediate portion 42'' of the wall 42 being provided with a curved surface 55 between and on each side of the lugs 50 also aiding in draining water from the chamber 13 to the chamber 14.

At the side of the chamber 13 may be provided a hand-hole opening 56 normally closed by a cover 57 secured in place by bolts 58, this hand-hole opening permitting access to the air chamber 13 whereby the auxiliary air valve and the valve seat thereof may be cleaned and the auxiliary air valve manually closed into the position shown upon the drawing, after the system has operated. The main casing may also be provided with a hand-hole giving access into the chamber 14 and normally closed by the plate 59 suitably secured to the casing by means of bolts 60 and nuts 61.

The inlet 2 may be provided with a threaded connection 62 leading to a water test valve or gauge (not shown) which may be opened at any time desired to determine whether or not the inlet 2 is filled with water. A connection 63 may also be provided leading to a sprinkler head which is of utility to protect the housing usually used for enclosing the dry pipe valve. In the chamber 12, at a low point thereof, may be provided an aperture 64 leading to the usual form of ball drip connection or valve (not shown) the same operating in its usual manner to permit the out-flow of small leakage that might possibly occur through the valves into the chamber 12 and preventing accumulation of water in said chamber but which will close when full pressure of water is present in the chamber 12. In the upper part of the chamber 12 may also be provided an aperture 65 leading to a connection communicating with an alarm or alarm controlling device and operative to supply water to the alarm or the controlling device when the chamber 12 is filled with water after the main valve is opened. At the lower end of the chamber 14 may be connected, as with screw threads, a system drain connection 66 in which may be provided an ordinary hand valve (not shown). This drain valve is normally closed and is only of utility for draining water from the system after the dry pipe valve has operated and after the fire has been extinguished so as to drain all of the water that might possibly remain in the distributing conduits and pipes, the flow of such water occurring through the chamber 13, aperture 54, chamber 14 and finally into connection 66. In the chamber 13 is preferably provided an aperture 67 leading to a connection communicating with an air supply and also to a priming source. When the valves are in closed position and the system is to be set ready for operation, priming water may first be supplied through the opening 67 into the chambers 13 and 14 so as to water seal the valves 24 and 45, the water level being substantially at the level 68 indicated upon the drawing. Air under compression may then be supplied through the aperture 67 from a suitable air supply source (not shown) to fill the distributing system with compressed air which usually is approximately twenty five pounds per square inch. The water supply may then be opened into the conduit 3 and the inlet 2 to the valve 17, the connection 62 being open to permit escape of air until the inlet conduit is filled, whereupon the connection 62 may be closed. The apparatus is constructed to withstand at least one hundred and fifty pounds pressure per square inch of water on the inlet side of the water valve although any pressure desirable may be used.

The valve 24, it will be observed, is located slightly inclined to the vertical on the side towards the water valve and the water valve is located in an inclined position as shown in order that the air and water valves may be located as closely together as possible whereby a strong and short connection may be made between the water valve and air valve by means of the arm 23 and yet not interfere materially with the direct straight line flow of the extinguishing fluid from the inlet 2 to the outlet 7. It will be observed that the axis of the outlet 7 is located somewhat to the right of the axis of the inlet 2, as shown upon the drawing, whereby, as the liquid is caused to issue through the water valve port the stream will be slightly deflected to the right and will then curve upwardly and flow directly through the auxiliary valve port and through the outlet 7, the depending portion 42″ of the wall 42 being so located that the main flow of the water will be through the auxiliary valve port and will aid in preventing a substantial flow of water through the port 54 against the rear side of the auxiliary valve 45, thus preventing the latter from swinging back into closed position and causing water columning. The auxiliary air valve is adapted to swing substantially 180° from horizontal to horizontal position and it is well known that when a valve of this type has reached a position less than 30° with the horizontal, it is practically impossible for the fluid stream of the type passing through a device of the kind herein disclosed to lift said valve and to carry it back to its seat.

The device when in static position has the parts in the position as shown upon the drawing whereby air of relatively low pressure operates against the fluid in the chamber 14 to maintain the air valve 24 seated, the total thrust against the air valve 24 being at least equal to and usually larger than the total thrust of the water against the smaller water valve 17 although the water pressure intensity may be much greater than that of the air, the pressure in the chamber 12 being that of the atmosphere.

In operation, when a sprinkler head is caused to open upon the occurrence of a fire, the air pressure in the distributing conduits and pipes will be rapidly reduced to a point at which the thrust or total pressure acting against the air valve 24 will be reduced to less than that against the water valve on the water side thereof. The water, therefore, immediately will become effective to force the water valve 17 into open position, carrying with it the air valve 24, about the pivot 38, to the right, as shown on the drawing, into the chamber 14. Inasmuch as the chamber 14 is filled with water the inward rush of the water through the water valve port against the valve 17 will be counteracted by the cushioning effect of the water in the chamber 14, the latter seeking its escape through the opening provided between the valve 24 and its seat 34 thereby offering resistance to a sudden opening of the valves. This is desirable in order to prevent rebound such as frequently occurs in dry pipe valves previously in use. It is known that if a valve of this type be opened suddenly it may strike against the parts of the casing with such a force as to rebound and to again close the valve, oftentimes producing a delay of the operation of the system as well as injuring the device. In my device, by providing a water cushion beneath the air valve the force of the extinguishing fluid issuing from the inlet 2 will be counteracted or almost counterbalanced so that by the time that the air valve has moved to the right, as shown upon the drawing, past the vertical, the water valve shall have moved from the port thereof sufficiently to permit the main flow of the extinguishing fluid to be directed upwardly through the auxiliary air valve port to the outlet 7, a small component of the force of that stream being used, merely, in initiating the opening of the differential valve. The air valve, as it moves by the vertical position to the right, as shown upon the drawing, will, of its own weight, tend to continue to move to open position and carry with it the water valve, but in closed position the valve is slightly inclined from the vertical toward the water valve so that its weight has a tendency to aid the closing action of the water valve and it is only after it has moved past the vertical to the right, that its weight aids in moving the water valve into open position.

If the air valve due to corrosion should move out of alinement the tapered surface 34 of the ring 32 will operate against the inner edge of the ring 28 to bring the air valve into properly alined or centered position as the air valve is moved to closed position. The water valve likewise, due to being provided with a ball-and-socket connection 21 and 25 also is adapted to move into self adjusting position in the event that the water valve does not initially seat squarely or evenly.

The hand-hole provided in the chamber 14 is of utility for access to clean the water and air valves and to replace the same into closed position prior to re-establishing the static condition of the system for its next operation.

While I have herein described and illustrated upon the accompanying drawing one embodiment of my invention it is to be understood that the same is not to be considered limited to the particular details described and shown but that the same comprehends other forms and arrangements of parts as do not depart from the spirit of the invention and the scope of the appended claims.

Having thus described my invention what I claim and desire to protect by Letters Patent of the United States is:

1. In an automatic dry pipe valve for fire extinguishing systems, the combination of a casing provided with an inlet, an outlet, a central chamber and an air chamber all in substantial alignment, a cushion chamber located adjacent said central chamber and provided with a small opening communicating with said air chamber and a large opening communicating with said central chamber the surface of the bottom of the air chamber being curved in the direction of said small opening to drain the air chamber into said cushion chamber, an inclined water valve in said central chamber adapted to close said inlet, an air valve of relatively large area in said cushion chamber and adapted to close the opening between said central and cushion chambers, said air valve having an inclined surface adapted to guide the valve to proper seating position on its seat, an arm rigid with said air valve for connecting said water and air valves whereby said valves move in unison, means located in said cushion chamber for pivotally mounting said air valve in said chamber, said last mentioned means and said air valve being rigidly secured together, a valve seat for said air valve surrounding the opening between said central and said cushion chambers said seat having its top inclined from the vertical toward said water valve, and an auxiliary air valve between said central and said air chambers.

2. In an automatic dry pipe valve for fire extinguishing systems, the combination of a casing provided with an inlet, an outlet and a cushion chamber, a differential valve having the valves thereof in acute angular disposition, a short connecting arm rigid with one of said valves and universally connected to the other of said valves whereby the latter is self-adjustable to its seat, the smaller valve of said differential valve adapted to control the flow of extinguishing fluid through said casing and the larger valve of said differential valve located out of the path of the fluid passage between said inlet and said outlet, an arm pivotally mounted in said cushion chamber and rigidly secured to said larger valve, means to supply air pressure to said larger valve and means for cushioning the opening movement of said differential valve to prevent rebound thereof.

In witness whereof, I have hereunto set my hand this 13th, day of March, 1920.

LEROY M. LEWIS.